United States Patent [19]

Ureshino

[11] Patent Number: 5,601,850
[45] Date of Patent: Feb. 11, 1997

[54] CENTER MECHANISM OF TIRE VULCANIZING PRESS

[75] Inventor: Kashiro Ureshino, Takasago, Japan

[73] Assignee: Kabushiki Kaisha Kobe Seiko Sho, Kobe, Japan

[21] Appl. No.: 446,332

[22] Filed: May 22, 1995

Related U.S. Application Data

[63] Continuation-in-part of Ser. No. 253,550, May 4, 1994, abandoned.

[30] Foreign Application Priority Data

May 7, 1993 [JP] Japan .................................. 5-131073

[51] Int. Cl.⁶ .................................................. B29C 35/00
[52] U.S. Cl. ............................... 425/48; 425/51; 425/52
[58] Field of Search ........................... 156/394.1; 425/23, 425/33, 45, 51, 52, 58, 58.1, 27, 48

[56] References Cited

U.S. PATENT DOCUMENTS

| | | | |
|---|---|---|---|
| 3,976,409 | 8/1976 | Athey | 425/48 |
| 4,144,007 | 3/1979 | Singh | 425/58 |
| 4,670,209 | 6/1987 | Nakagawa et al. | 425/52 |
| 4,846,649 | 7/1989 | Hasegawa et al. | 425/51 |
| 5,098,269 | 3/1992 | Irie et al. | 425/52 |

*Primary Examiner*—Michael W. Ball
*Assistant Examiner*—Richard Crispino
*Attorney, Agent, or Firm*—Oblon, Spivak, McClelland, Maier & Neustadt, P.C.

[57] ABSTRACT

Disclosed herein is a center mechanism of a tire vulcanizing press, including a press frame; a guide member provided on the press frame, the guide member having a central hole and a peripheral hole formed around the central hole; a cylindrical member slidably guided in the central hole of the guide member in a vertical direction; a hub fixed to an upper end of the cylindrical member for holding a lower portion of a bladder, the hub having a central hole; a center post slidably inserted through the central hole of the hub for holding an upper portion of the bladder; and a cylinder unit provided between the hub and the center post so as to extend in parallel relationship to the center post, for vertically moving the center post relative to the hub, the cylinder unit having a cylinder body and a rod adapted to be advanced upwardly from an upper end of the cylinder body, the rod being inserted through the peripheral hole of the guide member. Accordingly, downward projection of the center mechanism can be suppressed and the cylinder unit can be stored in the press frame in transporting the tire vulcanizing press.

6 Claims, 4 Drawing Sheets

CENTER MECHANISM OF TIRE VULCANIZING PRESS

This is a continuation in part of U.S. patent application Ser. No. 08/253,550 filed May 4, 1994 and now abandoned.

BACKGROUND OF THE INVENTION

1. Field of the Invention

The present invention relates to a center mechanism of a tire vulcanizing press wherein a bladder is held by the center mechanism adapted to be vertically moved at the center of the press, and more particularly to such a center mechanism wherein downward projection of the center mechanism can be suppressed by modifying the arrangement of a cylinder unit.

2. Description of the Related Art

FIG. 3 shows a conventional center mechanism of a tire vulcanizing press, wherein a green tire T is set on a lower mold 53 fixed through a lower-mold mounting member 52 on a base frame 51 by a vertically movable loader 55 having a chuck 54 to carry out shaping of the green tire T. A center mechanism 58 is provided through a guide sleeve 59 at a central portion of the lower-mold mounting member 52. The center mechanism 58 includes a lift member 60 vertically movably inserted through the guide sleeve 59, a center post 61 vertically movably inserted through the lift member 60, a first cylinder unit 63 located under the lift member 60 and having a piston rod 63a adapted to be advanced upwardly, and two second cylinder units 64 located on opposite sides of the first cylinder unit 63 and having piston rods 64a adapted to be advanced downwardly. A bottom ring 68 for holding a lower portion of a bladder 67 is supported to the upper end of the lift member 60, and a top ring 69 for holding an upper portion of the bladder 67 is supported to the upper end of the center post 61. The lower ends of the piston rods 64a of the second cylinder unit 64 are connected to the lower end of the first cylinder unit 63 by a connecting member 72. The lift member 60 is lowered or lifted together with the center post 61 by advancing or retracting the piston rods 64a of the second cylinder units 64, respectively. Further, the center post 61 only is lifted or lowered by advancing or retracting the piston rod 63a of the first cylinder unit 63, respectively.

The operation of the center mechanism of the tire vulcanizing press mentioned above will now be described. The bladder 67 is stretched in a vertical direction on the center line of the lower mold 53 as shown by a dots-dash line in FIG. 3 by lowering the lift member 60 to its lower limit position and lifting the center post 61 to its upper limit position. Then, the loader 55 with the chuck 51 grasping the green tire T is lowered to set the green tire T on the lower mold 53. After the green tire T is set on the lower mold 53, a pressure fluid such as stream or hot gas is introduced into the bladder 67 to expand it. During expansion of the bladder 67, the center post 61 is lowered to thereby lower the top ring 69. Thus, the bladder 67 is gradually deformed so as to fit on the inner surface of the green tire T. Finally, the bladder 67 is entirely brought into close fit with the inner surface of the green tire T, thereby performing the shaping of the green tire T. After completion of the shaping, an upper mold (not shown) is lowered to be fitted to the lower mold 53 to carry out vulcanizing of the green tire T.

After completion of the vulcanizing, the upper mold is lifted. Then, the lift member 60 is lifted together with the center post 61 to thereby separate and lift the vulcanized tire T from the lower mold 53. Then, the center post 61 is lifted and the lift member 60 is lowered to thereby separate and draw out the bladder 67 closely fitted with the inner surface of the vulcanized tire T. Finally, the vulcanized tire T is taken out of the tire vulcanizing press by a carrier member (not shown), thus completing one cycle of vulcanization.

In the center mechanism 58 of the tire vulcanizing press mentioned above, the first cylinder unit 63 for vertically moving the center post 61 only with respect to the lift member 60 is located in tandem under the lift member 60 in such a manner that the piston rod 63a is adapted to be advanced upwardly. Accordingly, the first cylinder unit 63 and the second cylinder units 64 located on the opposite sides of the first cylinder unit 63 are largely projected downward from the base frame 51. In this circumstance, in installation of the tire vulcanizing press, a deep pit 75 is dug in a floor to store the cylinder units 63 and 64. However, the deeper such a pit, the higher a cost required for foundation work. Further, in transportation of the tire vulcanizing press, the cylinder units 63 and 64 projecting downwardly from the base frame 51 cause a hindrance, and it is therefore necessary to prepare a special stand for the transportation.

SUMMARY OF THE INVENTION

It is accordingly an object of the present invention to provide a center mechanism of a tire vulcanizing press wherein downward projection of the center mechanism can be suppressed by modifying the arrangement of the cylinder unit.

It is another object of the present invention to provide a center mechanism of a tire vulcanizing press wherein the cylinder unit can be stored in a press frame in transporting the tire vulcanizing press.

According to the present invention, there is provided a center mechanism of a tire vulcanizing press, comprising a press frame; a guide member provided on the press frame, the guide member having a central hole and a peripheral hole formed around the central hole; a cylindrical member slidably guided in the central hole of the guide member in a vertical direction; a hub fixed to an upper end of the cylindrical member for holding a lower portion of a bladder, the hub having a central hole; a center post slidably inserted through the central hole of the hub for holding an upper portion of the bladder; and a cylinder unit provided between the hub and the center post so as to extend in parallel relationship to the center post, for vertically moving the center post relative to the hub, the cylinder unit having a cylinder body and a rod adapted to be advanced upwardly from an upper end of the cylinder body, the rod being inserted through the peripheral hole of the guide member.

When the rod of the cylinder unit is retracted into the cylinder body, the center post is raised with respect to the hub, while when the rod is advanced from the cylinder body, the center post is lowered with respect to the hub. As the center post and the cylinder unit are arranged in parallel to each other, the hub can be raised by raising the cylinder unit and the center post as a whole. Accordingly, no projection is present under the center post. Further, the cylinder unit can be stored in the press frame in the condition where the rod of the cylinder unit is fully retracted into the cylinder body to raise the center post.

As described above, the length of downward projection of the center mechanism can be minimized by the parallel arrangement of the cylinder unit and the center post. Accordingly, in installation of the tire vulcanizing press, the pit can be made shallow to thereby reduce the cost for foundation work. Further, the center mechanism can be stored in the press frame in the fully retracted condition of the rod of the cylinder unit. Accordingly, the tire vulcanizing press can be easily transported without a special stand.

Other objects and features of the invention will be more fully understood from the following detailed description and appended claims when taken with the accompanying drawings.

DESCRIPTION OF THE PREFERRED EMBODIMENT

Figure 1:
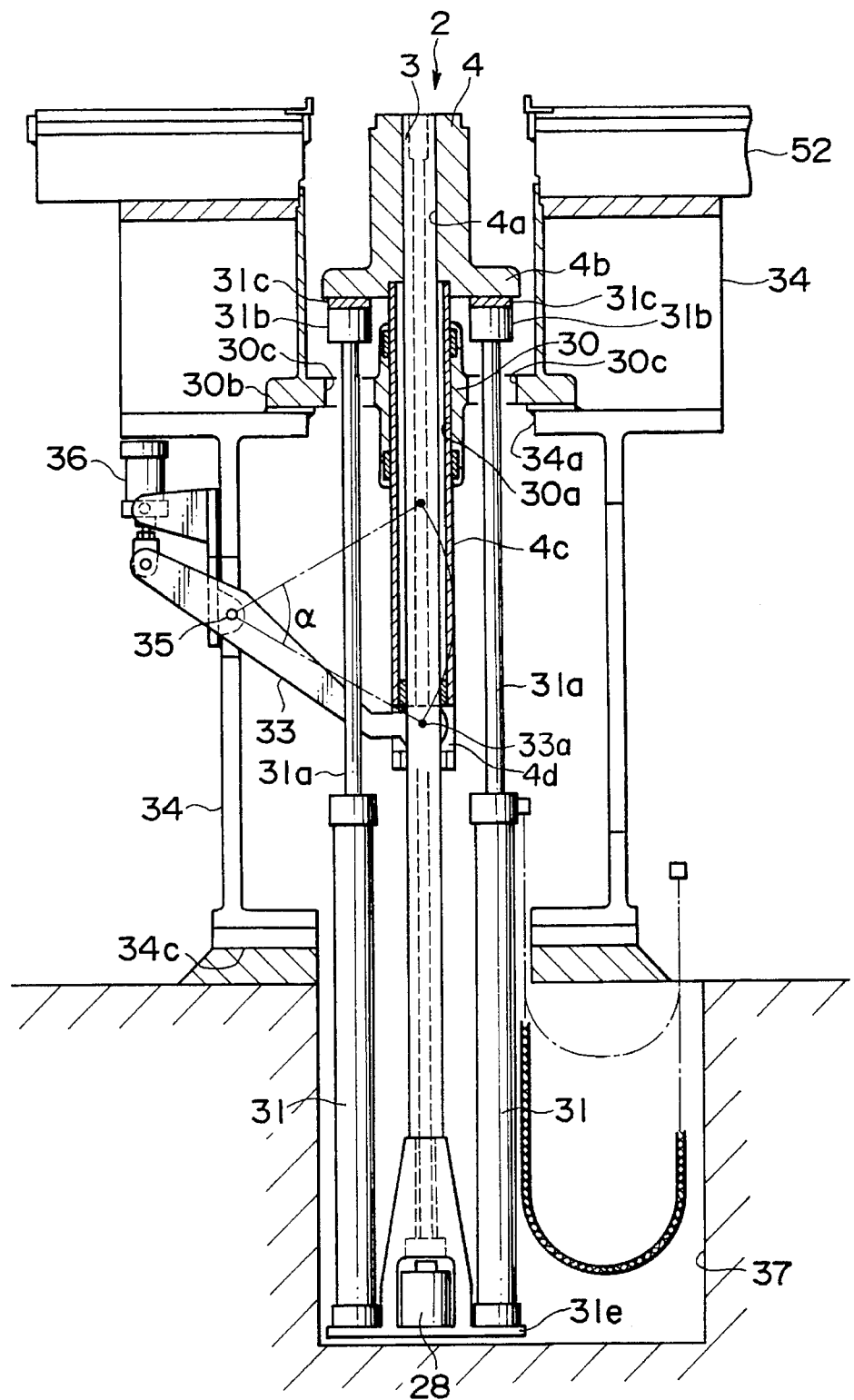
FIG. 1 is a vertical sectional view of a center mechanism of a tire vulcanizing press according to the present invention.

Referring to FIG. 1, there is shown a lower portion of a tire vulcanizing press including a center mechanism according to the present invention. The tire vulcanizing press shown in FIG. 1 includes a press frame 34, a lower-mold mounting member 52, and a center mechanism 2. The center mechanism 2 includes a center post 3 and a hub 4.

The hub 4 has a lower flange 4b, from which a cylindrical member 4c projects downwardly on a center line of the hub 4. The press frame 34 has an upper hole 34a, around which a guide member 30 is mounted. The guide member 30 has a central hole 30a extending vertically, and the cylindrical member 4c is slidably guided in the central hole 30a of the guide member 30. The cylindrical member 4c has a length such that it does not come out of the central hole 30a of the guide member 30 within a given stroke of a lever 33 operatively connected to a hydraulic cylinder 36 which will be hereinafter described.

Figure 4:
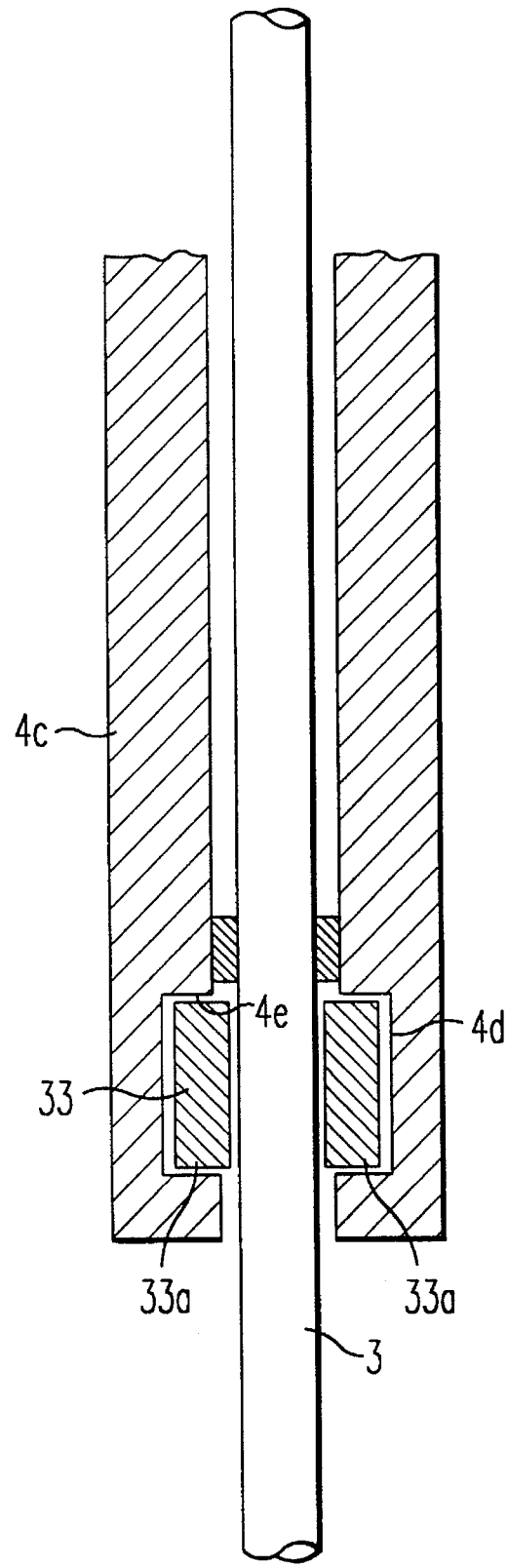
FIG. 4 is a detail, in section, of a lower portion of a cylindrical member of a hub and its connection to a lever.

Referring particularly to FIG. 4, the lower end of the cylindrical member 4c has a transverse horizontal slot 4d formed therethrough. The end of the lever 33 freely slides in this slot 4d. The slot 4d has an upper surface 4e against which the top of the lever 33 may press to raise the hub 4.

The center post 3 is slidably fitted within a central hole 4a of the hub 4. The end of the lever 33 is forked into two prongs 33a between which the center post can freely slide. A flange 31e is formed at the lower end of the center post 3. Two hydraulic cylinders 31 are provided on the flange 31e in opposite positions with respect to the center post 3. Cylinder bodies of the hydraulic cylinders 31 are fixed at their lower ends to the flange 31e, and supports 31b provided at the upper ends of rods 31a of the hydraulic cylinders 31 are fixed through heat insulating plates 31c to the flange 4b of the hub 4.

The guide member 30 has a flange 30b mounted on the press frame 34. The flange 30b is formed with two peripheral through holes 30c, and the rods 31a of the hydraulic cylinders 31 are inserted through the through holes 30c of the flange 30b of the guide member 30.

The lever 33 is pivotally supported at its intermediate portion through a pin 35 to the press frame 34. The other end of the lever 33 is operatively connected to a hydraulic cylinder 36 so that the lever 33 is pivoted about the pin 35 at a given angle a by the hydraulic cylinder 36. When the lever 33 is pivoted by the hydraulic cylinder 36, the hub 4 is vertically moved upwardly due to the engagement of the lever with the top surface 4e.

In a modification, the lever 33 and the hydraulic cylinder 36 as an actuator may be replaced by a cylinder unit.

The vertical operation of the center mechanism mentioned above will now be described. FIG. 1 shows a condition where the rods 31a of the hydraulic cylinders 31 are advanced to their upper limits and the center post 3 is in its lower limit position with respect to the hub 4. Further, the lever 33 is in its lowermost pivotal position, and accordingly the center post 3 and the hub 4 are kept as a unit in its lower limit position. The depth of a pit 37 is set so that the flange 31e does not interfere with the bottom of the pit 37 in the above condition. The center post 3 and the hydraulic cylinders 31 are arranged in parallel to each other, and the rods 31a extend to the upper portion of the press frame 34 (i.e., in the vicinity of the lower-mold mounting member 52), thus minimizing downward projection of the center mechanism. Further, the cylinder bodies of the hydraulic cylinders 31 extend below the rods 31a, so that the cylinder bodies are remote from the lower-mold mounting member 52 as a heat source, thereby limiting a heat quantity to be transmitted from the heat source through the rods 31a to the cylinder bodies.

When the rods 31a of the hydraulic cylinders 31 are operated from the above condition to retract into the cylinder bodies of the hydraulic cylinders 31, the cylinder bodies and the flange 31e fixed thereto are lifted as a unit. As a result, the center post 3 is lifted to project upward from the central hole 4a of the hub 4. When the cylinder bodies of the hydraulic cylinders 31 are lifted to their upper limits with respect to the rods 31a, the flange 31e comes to a vertical position higher than a bottom surface 34c of the press frame 34, thus fully storing the center mechanism within the press frame 34.

Further, when the hydraulic cylinder 36 is operated to upwardly pivot the lever 33, the hub 4 and center post 3 are lifted as a unit. As the lever 33 pivots, its forked ends 33a slide within the slot 4d. Then, the center post 3 is operated to expand a bladder (not shown in FIG. 1) in a desired position.

Figure 2:
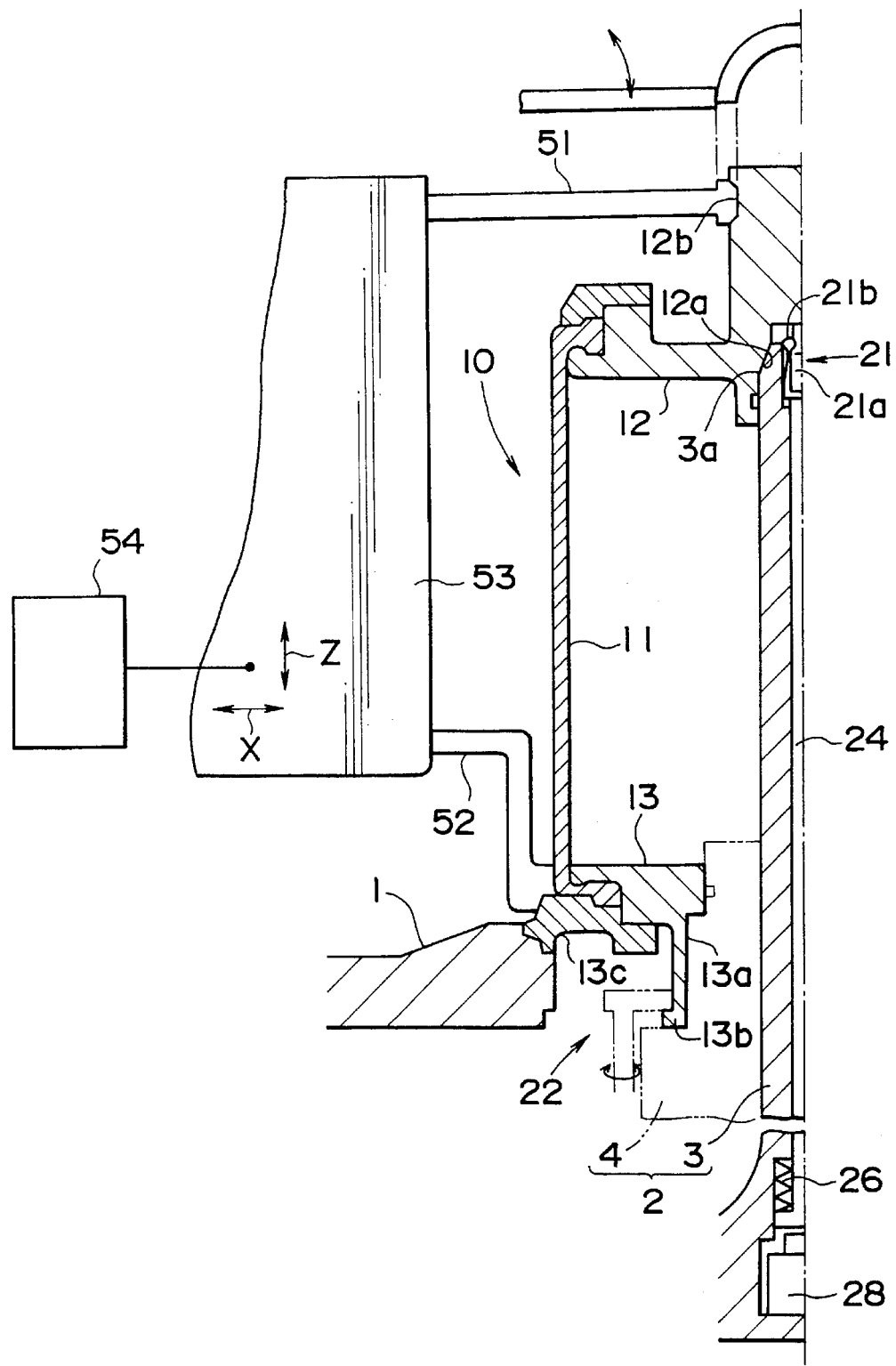
FIG. 2 is a partially cutaway, vertical sectional view illustrating a mounted condition of a bladder assembly to the center mechanism.

Referring next to FIG. 2, there is shown a mounted condition of a bladder assembly 10 to the center mechanism 2 mentioned above, wherein reference numeral 1 denotes a lower mold, and the center mechanism 2 is located at the center of the lower mold 1.

The bladder assembly 10 includes a bladder 11 as a rubber bag, a top ring 12 nipping the upper end of the bladder 11, and a bottom ring 13 nipping the lower end of the bladder 11. The bottom ring 13 has a central hole 13a engaging with the hub 4, a flange portion 13b abutting against a shoulder portion of the hub 4, and a bead ring 13c engaging with the lower mold 1. The top ring 12 has a central conical hole 12a. The central conical hole 12a engages with a conical shaft 3a formed at the upper end of the center post 3, thereby positioning the top ring 12.

A chuck 21 is openably provided inside the conical shaft 3a of the center post 3 so as to hold the top ring 12 to the center post 3. Further, a locking device 22 is releasably provided on the flange portion 13b of the bottom ring 13 so as to lock the bottom ring 13 to the hub 4. Accordingly, the bladder assembly 10 is detachably fixed in a given position to the center mechanism 2 by the chuck 21 and the locking device 22. The chuck 21 is a collet chuck having a nose 21a and openable jaws 21b. The jaws 21b are connected to a rod 24 of the center post 3 and are biased by a spring 26 in a direction drawing the nose 21a. When the rod 24 is raised by a cylinder 28, the jaws 21b are opened to release the nose 21a.

A carrier unit (not shown) is provided to carry the bladder assembly 10 to a position just over the center mechanism 2 and set the bladder assembly 10 in the given position shown in FIG. 2. The carrier unit includes an upper clamp 51 adapted to openably grasp a ring groove 12b of the top ring 12, a lower clamp 52 adapted to openably grasping the bead ring 13c of the bottom ring 13, an arm 53 from which the upper and lower clamps 51 and 52 project toward the bladder assembly 10, and driving means 54 for advancing and retracting the arm 53 in a direction of arrow X with respect to the center mechanism 2 and for raising and lowering the arm 53 in a direction of arrow Z with respect to the center mechanism 2.

In setting the bladder assembly 10 to the given position shown in FIG. 2, the bladder assembly 10 held by the upper and lower clamps 51 and 52 is advanced to the position just over the center mechanism 2 by the driving means 54, and is then lowered toward the center mechanism 2, thus obtaining the set position of the bladder assembly 10 in the tire vulcanizing press. At this time, the chuck 21 is in the open condition and the locking device 22 is in the released condition. Then, the chuck 21 is closed and the locking device 22 is operated to become a locking position, thus automatically fixing the bladder assembly 10 to the center mechanism 2. In removing and carrying the bladder assembly 10 from the center mechanism 2, a similar operation is automatically performed in the reverse procedure.

Figure 3:
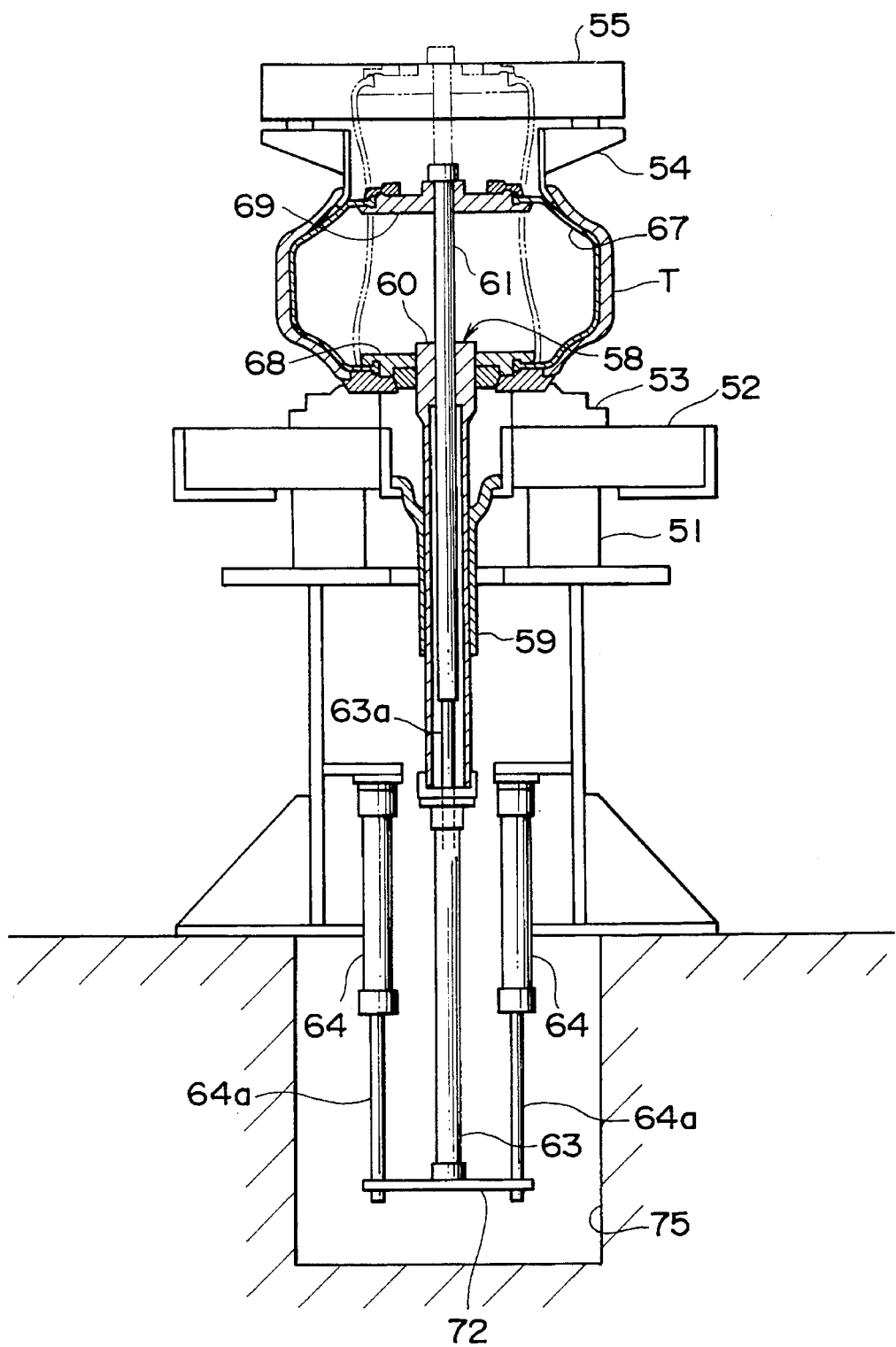
FIG. 3 is a vertical sectional view of a center mechanism of a tire vulcanizing press in the related art.

Then, the center mechanism 2 on which the bladder assembly 10 has been mounted is operated to control the bladder 11 to a desired space at a desired level, thus expanding the bladder 11 within a green tire T as shown in FIG. 3.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. A center mechanism of a tire vulcanizing press having a press frame and a bladder, the center mechanism comprising:

a guide member provided on said press frame, said guide member having a central hole and a peripheral through-hole formed around said central hole;

a cylindrical member slidably guided in said central hole of said guide member in a vertical direction;

a hub fixed to an upper end of said cylindrical member for holding a lower portion of a bladder, said hub having a central hole;

a center post slidably inserted through said central hole of said hub for holding an upper portion of said bladder;

a fluid cylinder unit connected between said hub and said center post so as to extend in parallel relationship to said center post, for vertically moving said center post relative to said hub, said cylinder unit having a cylinder body and a rod adapted to be advanced upwardly from an upper end of said cylinder body, said rod being inserted through said peripheral through-hole of said guide member; and an actuator for vertically moving said hub and said center post as a unit, wherein said actuator comprises a hydraulic cylinder mounted to said press frame and a lever having one end pivotably connected to said hub and the other end operatively connected to said hydraulic cylinder.

2. A center mechanism of a tire vulcanizing press according to claim 1, wherein said center post is formed at its lower end with a flange, and a lower end of said cylinder body is fixed to an upper surface of said flange of said center post.

3. A center mechanism of a tire vulcanizing press according to claim 2, wherein a lower surface of said flange of said center post is higher in level than a bottom surface of said press frame in a condition where said rod is fully retracted into said cylinder body.

4. A center mechanism of a tire vulcanizing press according to claim 1, wherein said cylinder unit comprises two hydraulic cylinders extending in parallel relationship to each other on opposite sides of said center post, further comprising a second peripheral through-hole the two peripheral through-holes being formed on opposite sides of said central hole of said guide member so as to allow a rod of each of said hydraulic cylinders to be inserted through a respective one of said peripheral through-holes.

5. A center mechanism of a tire vulcanizing press having a press frame and a bladder, the center mechanism comprising:

a hub for holding a lower portion of a bladder, the hub having a central hole;

a center post for holding an upper portion of said bladder, said center post being inserted through said central hole of said hub;

a fluid cylinder unit having one end connected to said hub and the other end connected to a bottom end of said center post for moving said center post relative to said hub; and an actuator for moving said hub and said center post as a unit.

6. A center mechanism of a tire vulcanizing press according to claim 5, wherein said cylinder unit includes a cylinder body and a rod adapted to be advanced upwardly from an upper end of said cylinder body.

* * * * *